(12) United States Patent
King et al.

(10) Patent No.: US 8,424,788 B1
(45) Date of Patent: Apr. 23, 2013

(54) FOOD CHOPPING DEVICE

(76) Inventors: Tiffani Suzanne King, Swartz Creek, MI (US); Nancy Lee King, Panama City, FL (US)

(*) Notice: Subject to any disclaimer, the term of this patent is extended or adjusted under 35 U.S.C. 154(b) by 93 days.

(21) Appl. No.: 12/962,824

(22) Filed: Dec. 8, 2010

(51) Int. Cl.
*A47J 43/00* (2006.01)

(52) U.S. Cl.
USPC .............................................. 241/94; 241/169

(58) Field of Classification Search .............. 241/94, 241/168, 169, 270, 272
See application file for complete search history.

(56) References Cited

U.S. PATENT DOCUMENTS

| | | | |
|---|---|---|---|
| 534,570 A | 2/1895 | Norris | |
| 634,892 A | 10/1899 | Jenks | |
| 2,680,907 A | 6/1954 | Palosaari | |
| 3,004,340 A | 10/1961 | Collins | |
| 3,933,315 A * | 1/1976 | Popeil | 241/166 |
| 6,585,179 B2 * | 7/2003 | Weibel et al. | 241/169 |
| 7,152,821 B2 * | 12/2006 | Aby-Eva et al. | 241/169 |

* cited by examiner

*Primary Examiner* — Mark Rosenbaum

(57) ABSTRACT

A food chopping device including a removable handle and a guard member that threadingly engages a frustoconical body to prevent splattering while chopping a food item while cooking the food item and further having interchangeable chopping attachment members that threadingly engage the body to accommodate coarse and fine chopping.

10 Claims, 7 Drawing Sheets

FOOD CHOPPING DEVICE

BACKGROUND OF THE INVENTION

Various types of food chopping devices are known in the prior art. However, what is needed is a food chopping device including a screw-on guard member that has a diameter that snuggly abuts a sidewall of a pan to prevent splattering while chopping a food item while cooking the food item while also allowing the guard member to be removed for washing and further having interchangeable chopping attachment members to accommodate coarse and fine chopping and thorough cleaning.

FIELD OF THE INVENTION

The present invention relates to games, and more particularly, to a food chopping device which includes a screw-on guard member and interchangeable chopping attachment members.

SUMMARY OF THE INVENTION

The general purpose of the present food chopping device, described subsequently in greater detail, is to provide a food chopping device which has many novel features that result in a food chopping device which is not anticipated, rendered obvious, suggested, or even implied by prior art, either alone or in combination thereof.

To accomplish this, the present food chopping device provides a screw-on guard member to prevent splattering while chopping a food item while cooking the food item and further having interchangeable chopping attachment members to accommodate coarse and fine chopping. The food chopping device includes a handle having a first edge and an opposite second edge as well as an annular shaped base to which the handle is attached. The device also includes a frustoconical body with a circular apex, an opposite bottom chopping end, and a continuous cutting edge disposed along a lower perimeter of the bottom chopping end. A plurality of spaced apart volumetric indicia are longitudinally disposed on an exterior wall of the body. The body also includes a female upper threaded portion continuously encircling the body proximal to the body apex, the upper threaded portion parallel to the cutting edge and removably threadingly engaging the base inside wall. A female lower threaded portion continuously encircles the body proximal to the bottom chopping end and runs parallel to the upper threaded portion. A female middle threaded portion encircles the body midway parallel to the upper threaded portion between the upper threaded portion and the lower threaded portion.

A quoit-shaped guard member having an outer edge, a continuous threaded inner edge, and a diameter greater than a diameter of the body is also provided. The inner edge removably threadingly engages the middle threaded portion of the body. The guard member allows a user to chop a food item, such as meat, ground meat, and vegetables, in a heated pan without splattering. The outer edge of the guard member snuggly abuts the sidewalls of a pan to prevent splattering. The guard member is provided in different sizes to fit against the sidewalls of differently sized pans. The heat resistant nature of the guard member enables the device to be used in a heated pan while a food item is cooking. Further, the guard member is removable for thorough washing. The food item, pan, side wall of the pan, the stove, and the hand are for illustrative purposes only and are not part of the device.

The device also includes an annular first chopping attachment member having a continuous outer wall, a continuous inner wall with a continuous threaded upper edge, and a cavity therebetween. A sharp first chopper blade disposed across the entire cavity below the threaded upper edge. The first chopper blade is arranged in a first grid configuration having a plurality of spaced apart apertures. The inner wall selectively removably attaches to the body lower threaded portion. An annular second chopping attachment member includes a second chopper blade arranged in a second grid configuration having a plurality of spaced apart gaps therein. Each gap of the second grid configuration is narrower than each aperture of the first grid configuration. The interior wall of the second chopping attachment member selectively removably attaches to the body lower threaded portion. Thus, the first chopping attachment member and the second chopping attachment member interchangeably engage the body lower threaded portion, for coarse chopping and fine chopping, respectively. Also, the removability of the first and second chopping attachment members permits thorough washing.

The handle, the base, the body, the guard member, the outer wall and the inner wall of the first chopping attachment member, and the exterior wall and the interior wall of the second chopping attachment member are formed of heat resistant, dishwasher safe plastic. The plastic is transparent thus permitting a user to see through the guard member while chopping a food item and to see through the body while measuring a food item amount contained therein.

In one embodiment, the handle, the base, and the body have a combined height in a range of approximately 7 to 11 inches and each cutting edge has a length in a range of approximately 1 inch to 3 inches. The guard member has a diameter in a range of approximately 6 inches to 12 inches to snuggly abut against the side wall of a pan in a wide range of sizes; however the diameter of the guard member may be greater or lesser to fit other pan diameters. Also, the middle threaded portion is disposed approximately 5 inches below the apex. The dimensions may vary to accommodate the size of a pan in which the device will be used. The cutting edge may be blunt as a safety precaution to prevent injuries. Also, the cutting edge may be coated with metal. Each of the first chopper blade and the second chopper blade are formed of a sharpened metal, including stainless steel or other material that can readily withstand repeated washings.

To utilize the instant food chopping device, it can now be understood that the user assembles food chopping device by selecting a guard member that is sized to fit the pan that will be used to cook a food item chopped by the device. The user attaches the guard member by engaging the inner edge with the midportion threaded portion to secure guard member to the body. The user attaches the handle to the body by threadingly engaging the inside wall of the base to the upper threaded portion of the body. The user then selects the one of the cutting edge, the first chopping attachment member, and the second chopping attachment member with which to chop a food item. Upon the selection of the first chopping attachment member by which the food item is coarsely chopped, the user attaches the first chopping attachment member by threadingly engaging the inner wall to the lower threaded portion of the body. Upon the selection of the second chopping attachment member by which the food item is finely chopped, the user attaches the second chopping attachment member by threadingly engaging the interior wall to the lower threaded portion of the body. After placing food item in the pan on a stove and turning on the stove, the user grasps handle by placing apex in the user's palm and then raises and lowers the handle to chop the food item into pieces with the cutting edge disposed on the bottom chopping end. Once the food item is satisfactorily chopped, the user unscrews guard member and handle from the body so that food chopping device can be washed and conveniently stored.

Thus has been broadly outlined the more important features of the present food chopping device so that the detailed description thereof that follows may be better understood and in order that the present contribution to the art may be better appreciated.

Objects of the present food chopping device, along with various novel features that characterize the invention are particularly pointed out in the claims forming a part of this disclosure. For better understanding of the food chopping device, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
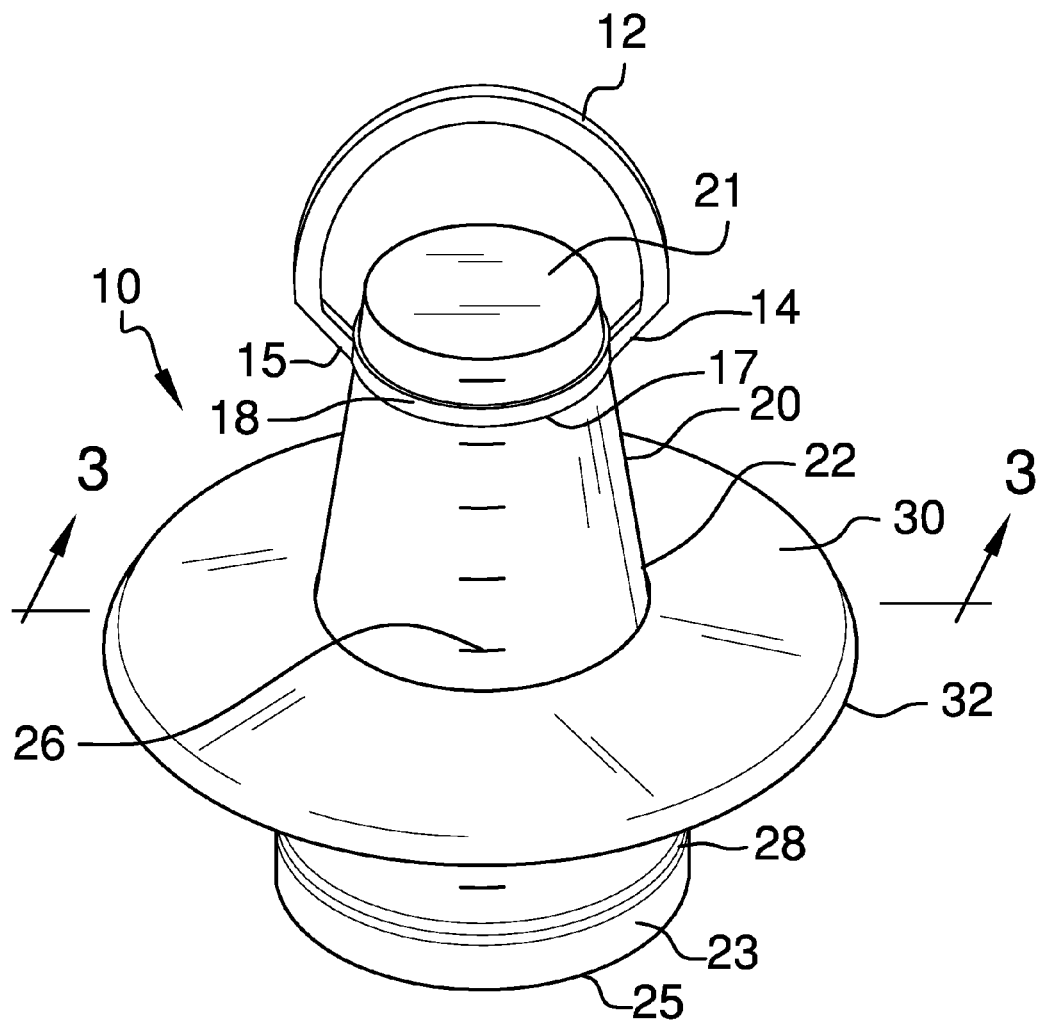
FIG. 1 is a top perspective view.
Figure 2:
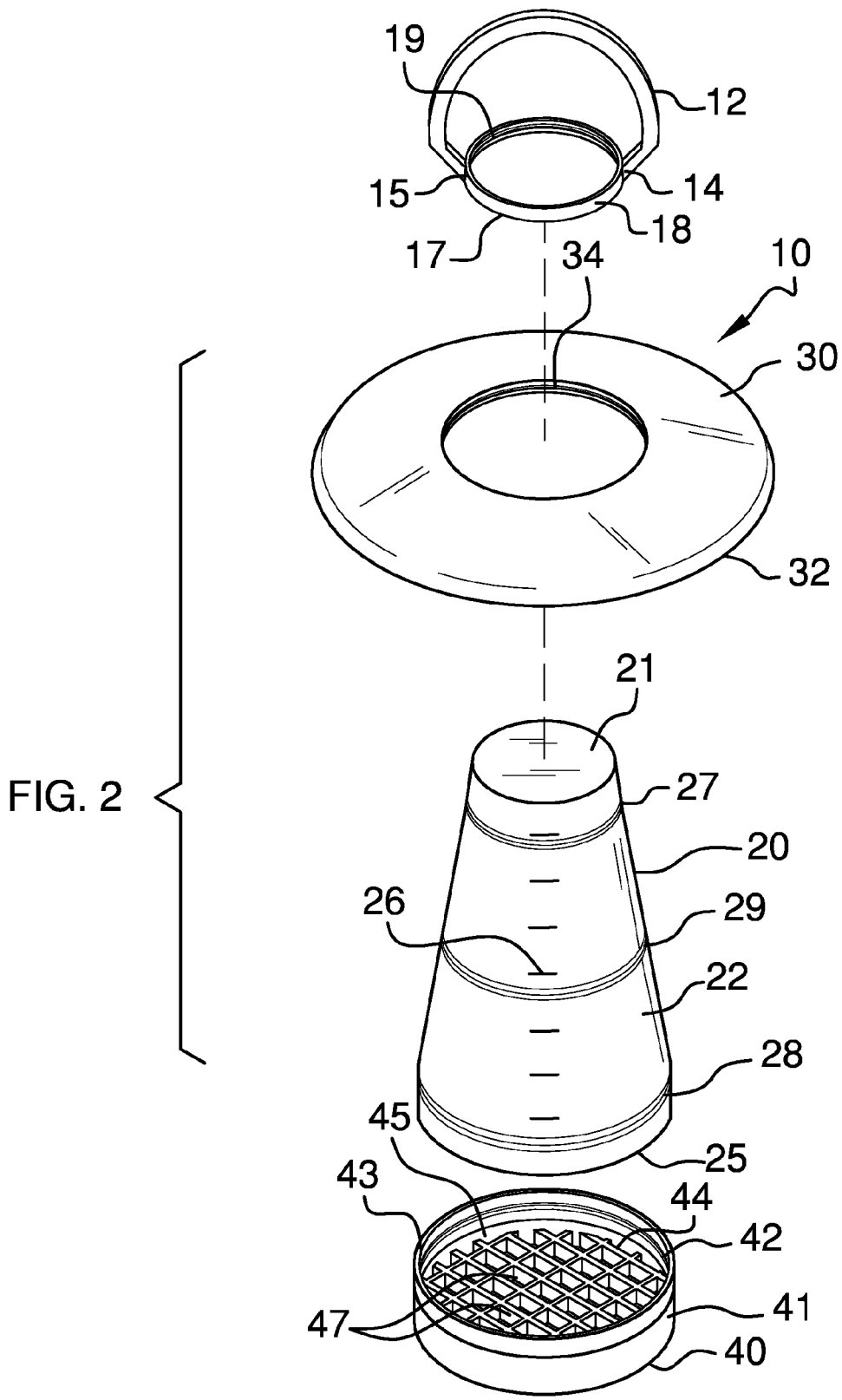
FIG. 2 is a top perspective exploded view.
Figure 3:
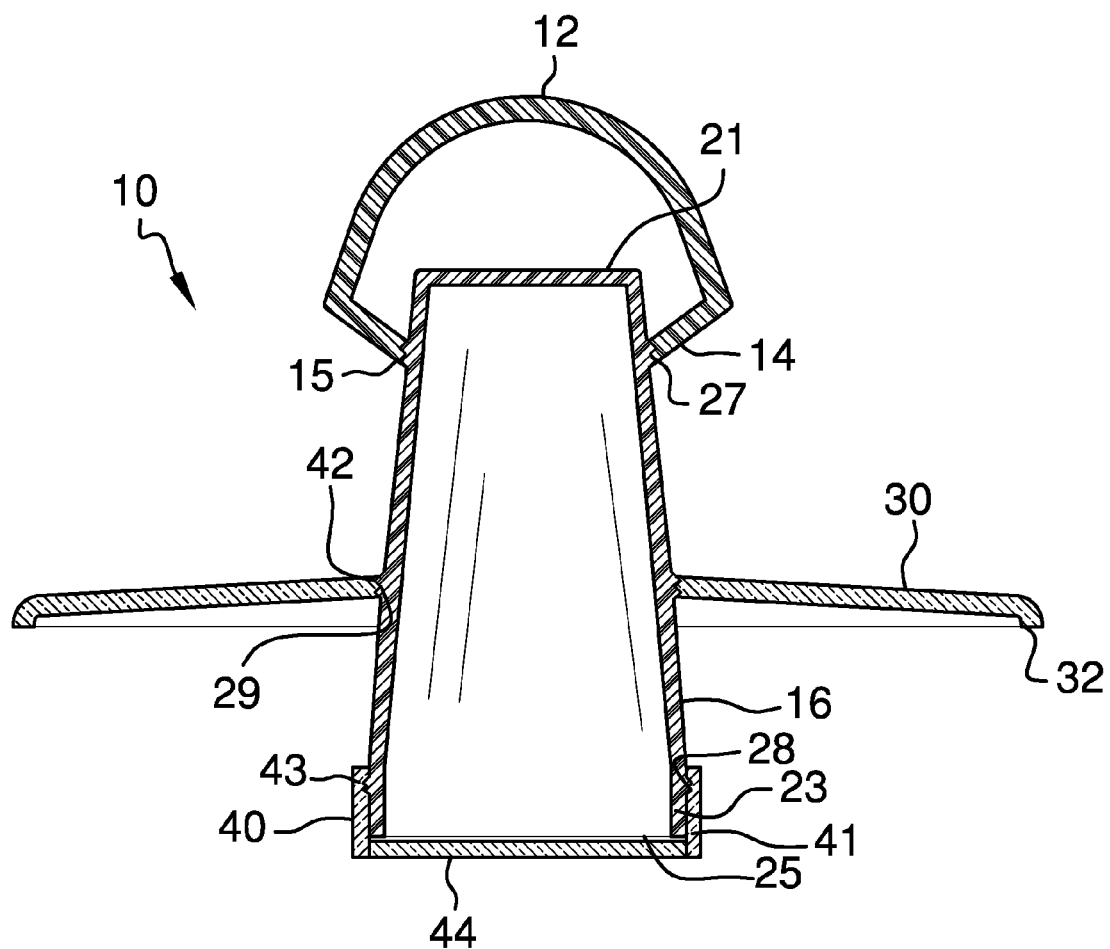
FIG. 3 is a cross-sectional view taken along line 3-3 of FIG. 1.
Figure 4:
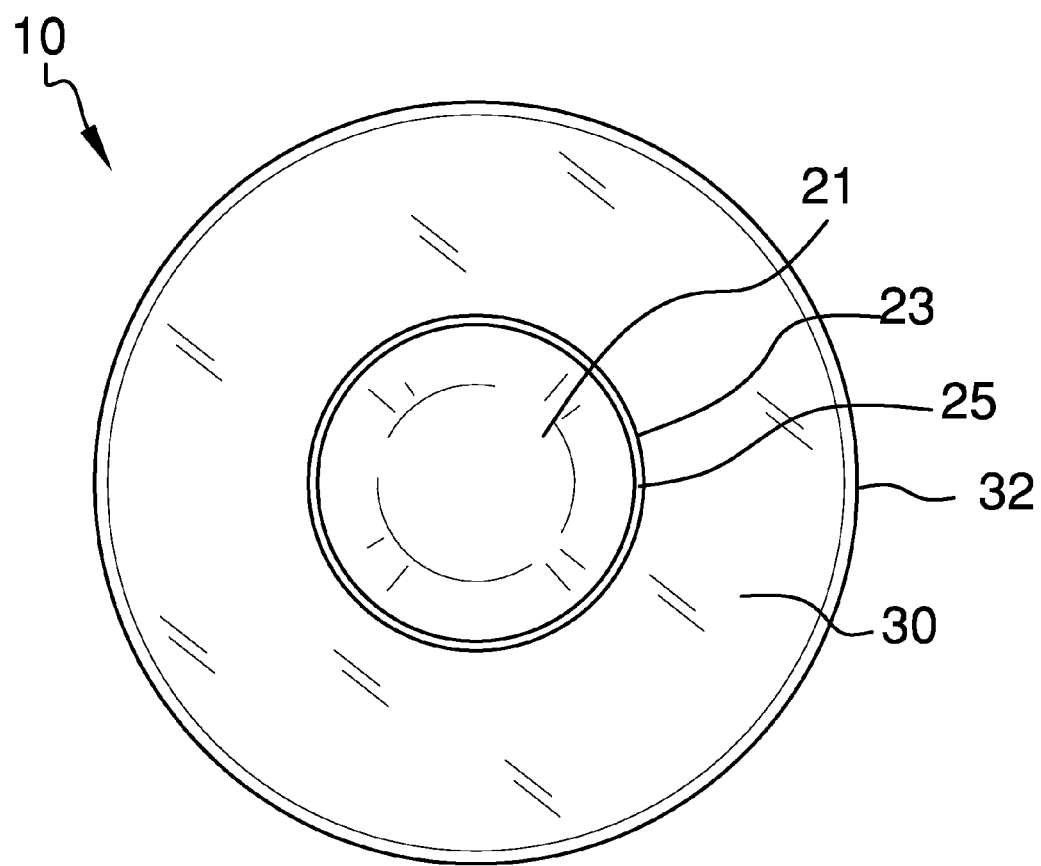
FIG. 4 is a bottom plan view.
Figure 5:
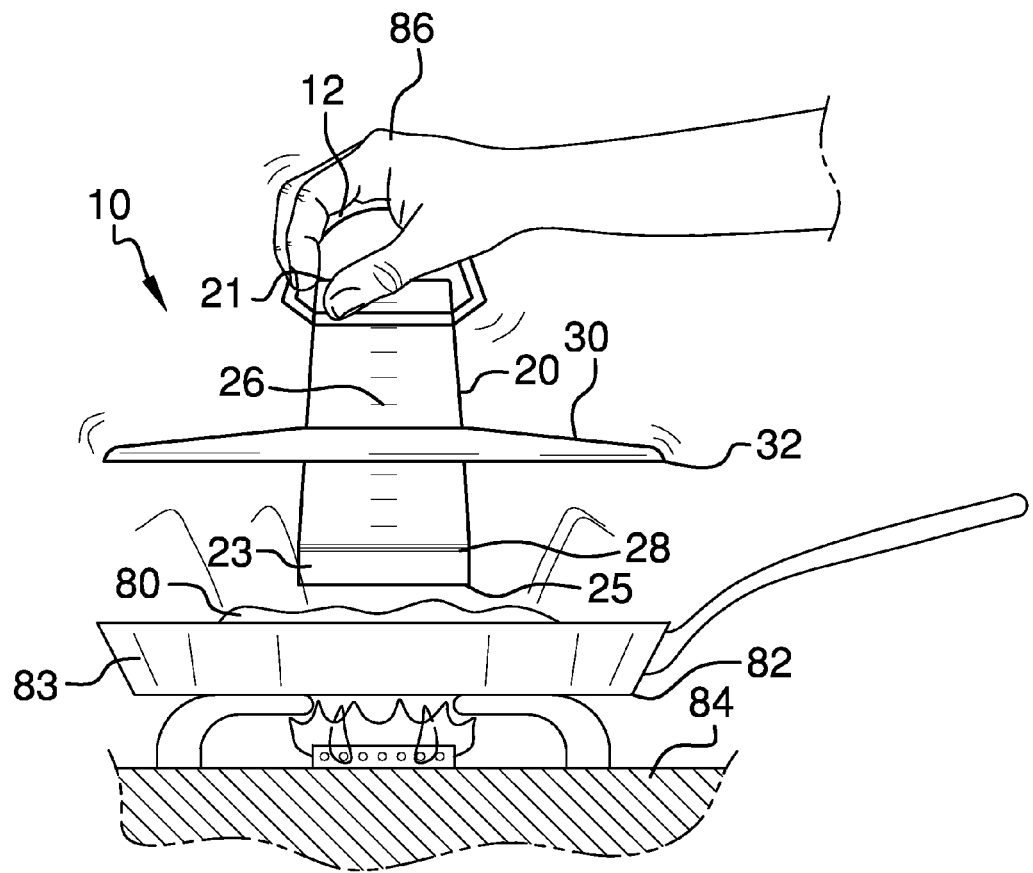
FIG. 5 is a side elevation in-use view.
Figure 6:
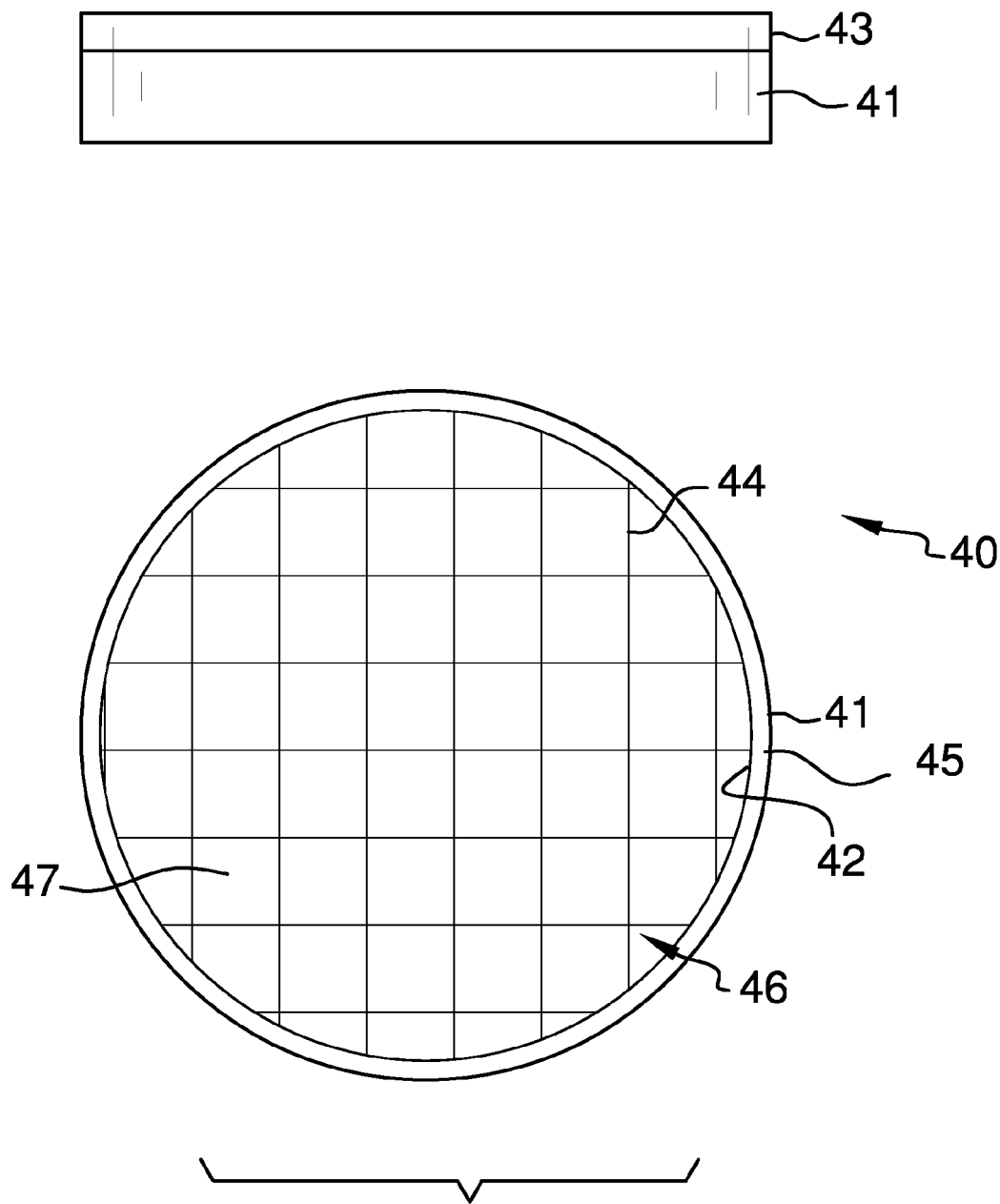
FIG. 6 is a side elevation and a bottom plan view of a first chopping attachment member separated for clarity.
Figure 7:
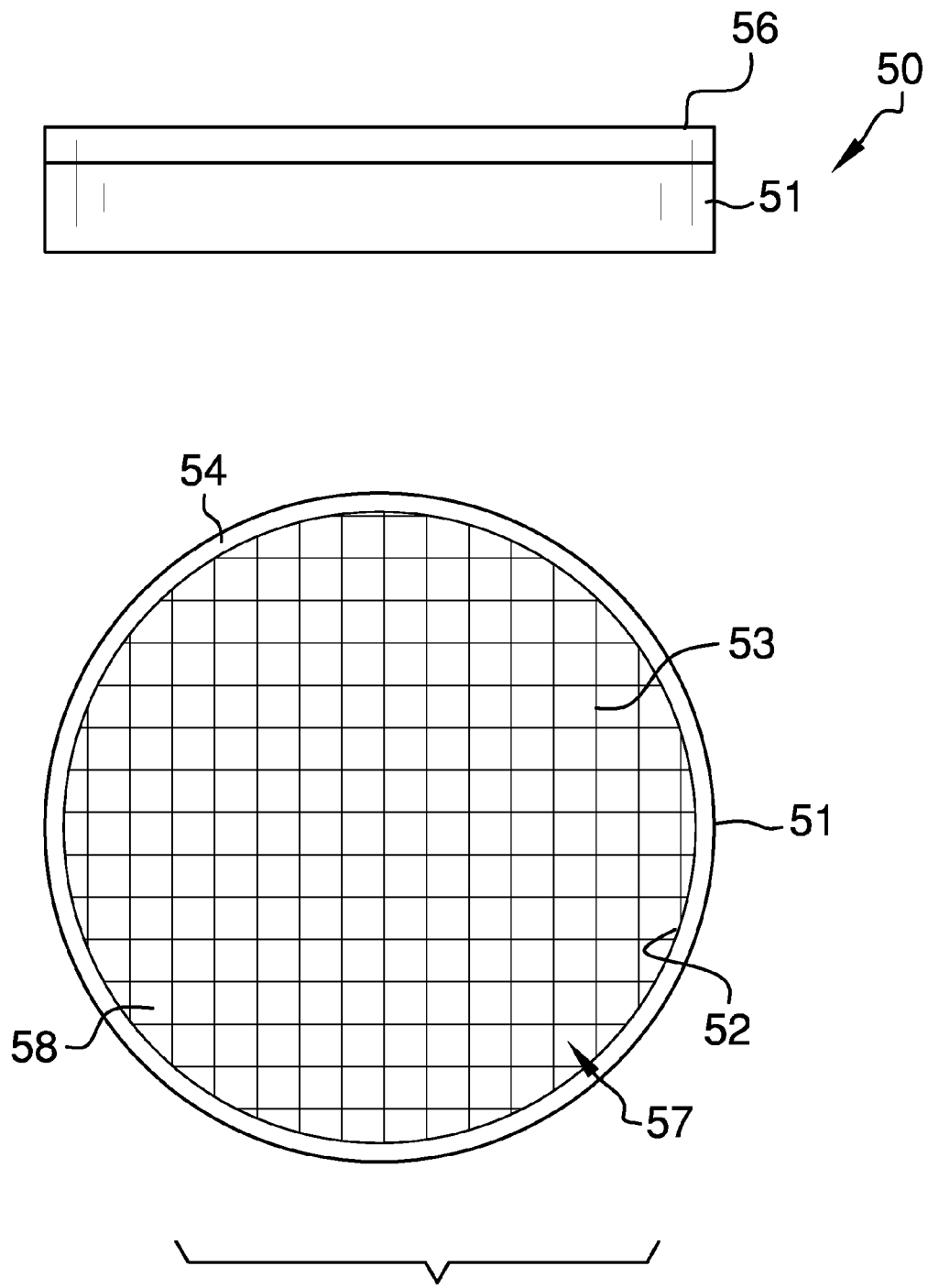
FIG. 7 is a side elevation view and a bottom plan view of a second chopping attachment member separated for clarity.

With reference now to the drawings, and in particular FIGS. 1 through 7 thereof, example of the instant food chopping device employing the principles and concepts of the present food chopping device and generally designated by the reference number 10 will be described.

Referring to FIGS. 1 through 7 a preferred embodiment of the present food chopping device 10 is illustrated. The food chopping device 10 includes a handle 12 having a first edge 14 and an opposite second edge 15 as well as an annular shaped base 17 to which the handle 12 is attached. The base 17 has a continuous outside wall 18 and a continuous threaded inside wall 19. The handle 12 first edge 14 is attached to the outside wall 18 and the handle 12 second edge 15 is attached opposite the first edge 14 to the outside wall 18.

The present device 10 also includes a frustoconical body 20 having a circular apex 21 and an opposite bottom chopping end 23. The body 20 includes a continuous cutting edge 25 disposed along a lower perimeter of the bottom chopping end 23. A plurality of spaced apart volumetric indicia 26 are longitudinally disposed on an exterior wall 22 of the body 20. The body 20 also includes a female upper threaded portion 27 continuously encircling the body 20 proximal to the body 20 apex 21. The upper threaded portion 27 is parallel to the cutting edge 25. The upper threaded portion 27 of the body 20 removably threadingly engages the base 17 inside wall 19. In addition, the body 20 includes a female lower threaded portion 28 continuously encircling the body 20 proximal to the bottom chopping end 23. The lower threaded portion 28 runs parallel to the upper threaded portion 27. The body 20 further includes a female middle threaded portion 29 encircling the body 20 midway between the upper threaded portion 27 and the lower threaded portion 28. The middle threaded portion 29 runs parallel to the upper threaded portion 27.

The present device 10 further includes a quoit-shaped guard member 30. The guard member 30 has an outer edge 32 and a continuous threaded inner edge 34. The guard member 30 also has a diameter greater than a diameter of the body 20. The inner edge 34 removably threadingly engages the middle threaded portion 29 of the body 20. The guard member 30 allows a user to chop a food item, such as meat, ground meat, and vegetables, in a heated pan without splattering. The outer edge 32 of the guard member 30 snuggly abuts the sidewalls of a pan 82 to prevent splattering. The guard member 30 is provided in different sizes to fit against the sidewalls of differently sized pans and tapered so that condensation rolls off back into the pan 82. The heat resistant nature of the guard member 30 enables the device 20 to be used in a heated pan 82 while a food item 80 is cooking. Further, the guard member 30 is removable for thorough washing. The food item 80, pan 82, side wall 83 of the pan 82, the stove 84, and the hand 86 are for illustrative purposes only and are not part of the current device 10.

The present food chopping device 10 also includes an annular first chopping attachment member 40. The first chopping attachment member 40 has a continuous outer wall 41, a continuous inner wall 42, and a cavity 45 therebetween. The inner wall 42 has a continuous threaded upper edge 43. The first chopping attachment member 40 includes a sharp first chopper blade 44 disposed across the entire cavity 45 below the threaded upper edge 43. The first chopper blade 44 is arranged in a first grid configuration 46 having a plurality of spaced apart apertures 47. The inner wall 42 selectively removably attaches to the body 20 lower threaded portion 28.

The present food chopping device 10 further includes an annular second chopping attachment member 50. The second chopping attachment member 50 has a continuous exterior wall 51, a continuous interior wall 52, and an opening 54 therebetween. The interior wall 52 has a continuous threaded top edge 56. The second chopping attachment member 50 includes a sharp second chopper blade 53 disposed across the entire opening 54. The second chopper blade 53 is arranged in a second grid configuration 57 having a plurality of spaced apart gaps 58 therein. Each gap 58 of the second grid configuration 57 is narrower than each aperture 47 of the first grid configuration 46. The interior wall of the second chopping attachment member 50 selectively removably attaches to the body 20 lower threaded portion 28. Thus, the first chopping attachment member 40 and the second chopping attachment member 50 interchangeably engage the body 20 lower threaded portion 28, for coarse chopping and fine chopping, respectively. Also, the removability of the first and second chopping attachment members 40, 50 permits thorough washing.

The handle 12, the base 17, the body 20, the guard member 30, the outer wall 41 and the inner wall 42 of the first chopping attachment member 40, and the exterior wall 51 and the interior wall 52 of the second chopping attachment member 50 are formed of heat resistant, dishwasher safe plastic. The plastic is transparent thus permitting a user to see through the guard member 30 while chopping a food item 80 and to see through the body 20 while measuring a food item 80 amount contained therein.

In one embodiment, the handle 12, the base 17, and the body 20 have a combined height in a range of approximately 7 to 11 inches and each cutting edge 25 has a length in a range of approximately 1 inch to 3 inches. The guard member 30 has a diameter in a range of approximately 6 inches to 12 inches to snuggly abut against the side wall 83 of a pan 82 in a wide range of sizes; however the diameter of the guard member may be greater or lesser to fit other pan 82 diameters. Also, the middle threaded portion 29 is disposed approximately 5 inches below the apex 21. The dimensions may vary to accommodate the size of a pan 82 in which the device 10 will be used.

The cutting edge 25 may be blunt as a safety precaution to prevent injuries. Also, the cutting edge 25 may be coated with metal. Each of the first chopper blade 44 and the second chopper blade 53 are formed of a sharpened metal, including stainless steel or other material that can readily withstand repeated washings.

Use:

To utilize the instant food chopping device 10, it can now be understood that the user assembles food chopping device 10 by selecting a guard member 30 that is sized to fit the pan 82 that will be used to cook a food item 80 chopped by the device 10. The user attaches the guard member 30 by engaging the inner edge 34 with the middle threaded portion 29 to secure guard member 30 to the body 20. The user attaches the handle 12 to the body 20 by threadingly engaging the inside wall 19 of the base 17 to the upper threaded portion 27 of the body 20. The user then selects the one of the cutting edge 25, the first chopping attachment member 40, and the second chopping attachment member 50 with which to chop a food item 80. Upon the selection of the first chopping attachment member 40 by which the food item is coarsely chopped, the user attaches the first chopping attachment member 40 by threadingly engaging the inner wall 42 to the lower threaded portion 28 of the body 20. Upon the selection of the second chopping attachment member 50 by which the food item is finely chopped, the user attaches the second chopping attachment member 50 by threadingly engaging the interior wall 52 to the lower threaded portion 28 of the body 20.

After placing food item 80 in the pan 82 on a stove 84 and turning on the stove 84, the user grasps handle 12 by placing apex 21 in the user's palm and then raises and lowers the handle 12 to chop the food item 80 into pieces with the cutting edge 25 disposed on the bottom chopping end 23. Once food item 80 is satisfactorily chopped, the user unscrews guard member 30 and handle 12 so that food chopping device 10 can be washed and conveniently stored.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

What is claimed is:

1. A food chopping device comprising:
   a handle having a first edge and an opposite second edge;
   an annular shaped base having a continuous outside wall and a continuous threaded inside wall, the handle first edge attached to the outside wall and the handle second edge attached opposite the first edge to the outside wall;
   a frustoconical body having a circular apex and an opposite bottom chopping end, the body comprising
      a continuous cutting edge disposed along a lower perimeter of the bottom chopping end;
      a female upper threaded portion continuously encircling the body proximal to the body apex, the upper threaded portion parallel to the cutting edge;
      wherein the upper threaded portion of the body removably threadingly engages the base inside wall;
      a female lower threaded portion continuously encircling the body proximal to the bottom chopping end, the lower threaded portion parallel to the upper threaded portion;
      a female middle threaded portion encircling the body midway between the upper threaded portion and the lower threaded portion, the middle threaded portion parallel to the upper threaded portion;
   a quoit-shaped guard member having an outer edge and a continuous threaded inner edge, the guard member having a diameter greater than a diameter of the body;
   wherein the inner edge removably threadingly engages the middle threaded portion of the body;
   an annular first chopping attachment member having a continuous outer wall, a continuous inner wall, and a cavity therebetween, the inner wall having a continuous threaded upper edge, the first chopping attachment member comprising:
      a sharp first chopper blade disposed across the entire cavity below the threaded upper edge, the first chopper blade arranged in a first grid configuration having a plurality of spaced apart apertures;
      wherein the inner wall selectively removably attaches to the body lower threaded portion;
   an annular second chopping attachment member having a continuous exterior wall, a continuous interior wall, and an opening therebetween, the interior wall having a continuous threaded top edge, the second chopping attachment member comprising:
      a sharp second chopper blade disposed across the entire opening below the threaded top edge, the second chopper blade arranged in a second grid configuration having a plurality of spaced apart gaps therein;
      wherein each gap of the second grid configuration is narrower than each aperture of the first grid configuration;
      wherein the interior wall selectively removably attaches to the body lower threaded portion.

2. The food chopping device of claim 1 wherein the plastic is transparent.

3. The food chopping device of claim 1 wherein the handle, the base, the body, the guard member, the outer wall and the inner wall of the first chopping attachment member, and the exterior wall and the interior wall of the second chopping attachment member are formed of heat resistant, dishwasher safe plastic.

4. The food chopping device of claim 3 wherein the guard member snuggly engages a continuous sidewall of a pan.

5. The food chopping device of claim 4 further comprising a plurality of spaced apart volumetric indicia longitudinally disposed on an exterior wall of the body.

6. The food chopping device of claim 5 wherein the guard member has a diameter in a range of approximately 6 inches to 10 inches.

7. The food chopping device of claim 6 wherein the handle, the base, and the body have a combined height in a range of approximately 7 to 11 inches; and
   wherein each cutting edge has a length in a range of approximately 1 inch to 3 inches.

8. The food chopping device of claim 7 wherein the middle threaded portion is disposed approximately 5 inches below the apex.

9. The food chopping device of claim 8 wherein the cutting edge is blunt.

10. The food chopping device of claim 9 wherein the cutting edge is coated with metal.

\* \* \* \* \*